March 31, 1970  SHUNJI KOBAYASHI ET AL  3,503,465
SILENCER FOR SUCTION OR DISCHARGE OF FLUIDS UNDER PRESSURE
Filed Aug. 4, 1967  5 Sheets-Sheet 1
F I G. 1
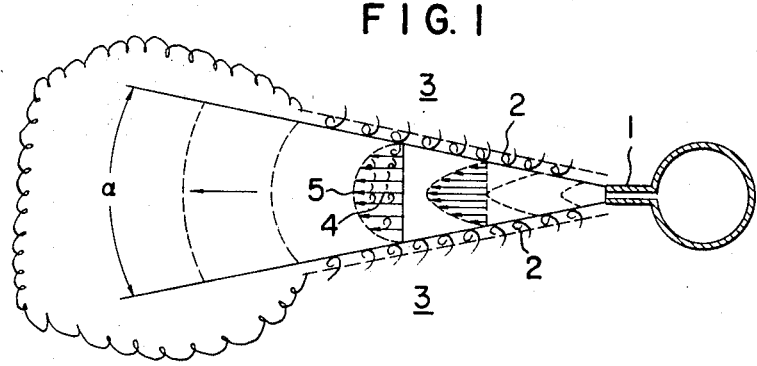
F I G. 2
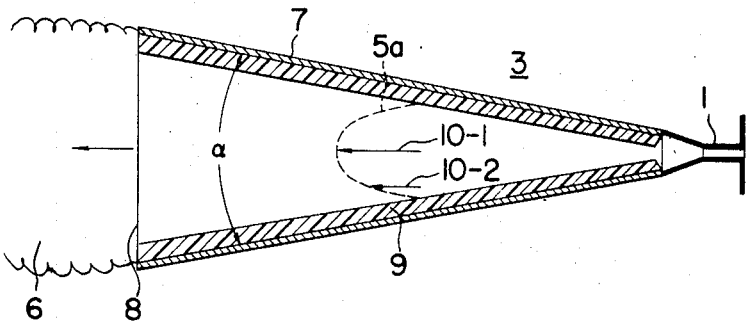
F I G. 3
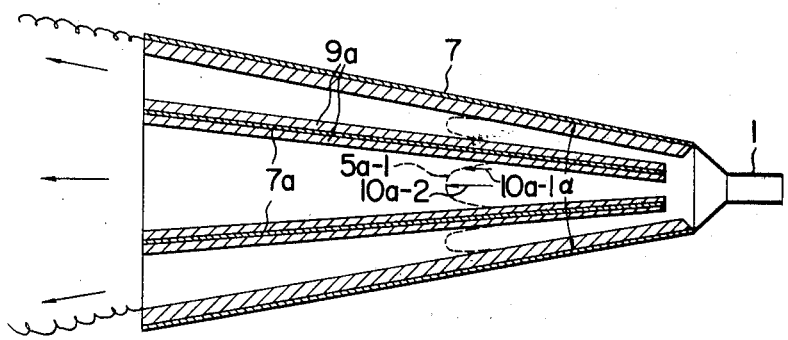
INVENTORS
SHUNJI KOBAYASHI
KOICHI HIRAMATSU
ISAO YOSHIHARA
SATHIHIRO KUWABARA
BY
H. Edward Mestern March 31, 1970 SHUNJI KOBAYASHI ET AL 3,503,465
SILENCER FOR SUCTION OR DISCHARGE OF FLUIDS UNDER PRESSURE
Filed Aug. 4, 1967 5 Sheets-Sheet 2

INVENTORS
SHUNJI KOBAYASHI
KOICHI HIRAMATSU
ISAO YOSHIHARA
SATHIHIRO KUWABARA
BY
H. Edward Mestern

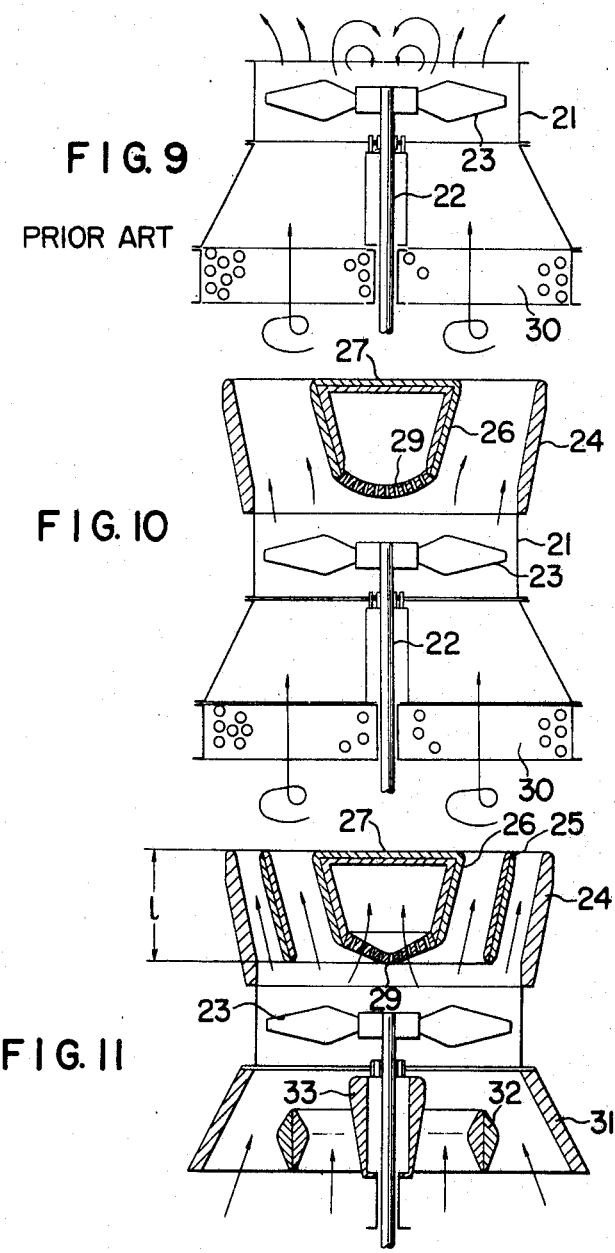

United States Patent Office 3,503,465
Patented Mar. 31, 1970

3,503,465
SILENCER FOR SUCTION OR DISCHARGE OF FLUIDS UNDER PRESSURE
Shunji Kobayashi, Yokohama-shi, Koichi Hiramatsu, Isao Yoshihara, and Sathihiro Kuwabara, Tokyo-to, Japan, assignors to Chiyoda Kako Kensetsu Kabushiki Kaisha, Tokyo-to, Japan, a joint-stock company of Japan
Filed Aug. 4, 1967, Ser. No. 658,395
Claims priority, application Japan, Aug. 5, 1966, 41/51,104; Jan. 30, 1967, 42/5,612
Int. Cl. F01n 1/24
U.S. Cl. 181—42                                      2 Claims

ABSTRACT OF THE DISCLOSURE

On the basis of the observation that a fluid under pressure diffuses in a conical path with a certain divergent angle into a region of lower pressure, a silencer, through which a noise generating flow of a fluid is passed, is made up of a combination of concentric outer, intermediate, and inner shells respectively having shapes of hollow truncated cones with specific divergent angles in the discharge direction and provided on both surfaces or single surfaces thereof with sound absorbing layers of specific thicknesses.

---

This invention relates generally to devices known as mufflers or silencers for reducing noise due to high-velocity flow of fluids. More particularly, the invention relates to silencers for reducing excessive and undesirable noise generated in cases wherein a gas under high pressure such as steam or a compressed gas is caused to undergo sudden expansion, wherein a gas is abruptly aspirated, or wherein a gas is aspirated and/or discharged by means of a fan or blower.

More specifically, the invention contemplates the provision of a new silencer of the above stated character having the shape of a hollow cone and producing very little back pressure, thereby to provide effective suppression means with respect to frequently occurring noise constituting a public nuisance.

Heretofore, the principal measures generally resorted to for reducing noise of the character referred to above have been: (a) to separate the noise source from regions where the noise would be undesirable, (b) to provide a sound shielding wall or barrier between the noise source and the regions where the noise would be undesirable, and (c) to muffle the noise at its source by means of one or more mufflers or silencers (hereinafter referred to as silencers).

The above measure (a) is obviously not suitable in an industrial area, where the population density is high, in already existing plants, mills, etc., and in similar places where noise reduction is often most needed. While measure (b) is substantially effective when the sound shielding wall structure is appropriately designed, its installation often entails very high costs.

In most of the silencers known heretofore for the above measure (c), sound reduction is accomplished principally by ejecting the gas causing the noise through numerous fine holes and, at the same time, reducing the gas velocity in a stepwise manner or by causing the gas to flow through a circuitous or tortuous path to reduce the gas flow velocity. In each case, since the gas velocity is forcibly reduced, the pressure loss of the silencer itself, that is, the back pressure, is disadvantageously excessive.

It is an object of the present invention to overcome the above described difficulties heretofore accompanying attempts to reduce noise.

More specifically, an object of the invention is to provide a silencer of simple and economical organization having high effectiveness in silencing noise with very low back pressure and not requiring special materials or special fabrication techniques.

According to the present invention, briefly summarized, there is provided a silencer for reducing noise generated by a flow of a fluid through an opening, the silencer comprising an outer shell of a configuration lying substantially in and along a surface corresponding to the outer boundary layer of the fluid flow in free state which it would assume prior to provision of the silencer and connected to the opening, the fluid thereby being caused to flow within the outer shell with or without one or more shell-like guide members disposed within the outer shell to divide the flow therein into a plurality of concentric flow paths without appreciably increased flow resistance and to provide streamline flow without turbulence, and sound absorbing material lining the surfaces of the outer shell and guide member or members along the flow paths.

The nature, principle, details, and utility of the invention will be more clearly apparent from the following detailed description with respect to preferred embodiments of the invention when read in conjunction with the accompanying drawings, in which like parts are designated by like reference numerals and characters.

In the drawings:

FIG. 1 is a diagrammatic representation indicating the state and behaviour of the released gas in the case wherein a gas under pressure is discharged naturally to a region of low pressure through a straight tube;

FIG. 2 is a side view, in longitudinal section, showing the basic form of a silencer according to the invention, in which an outer shell of the shape of a hollow truncated cone having a certain outwardly divergent angle is connected to the straight tube shown in FIG. 1;

FIG. 3 is a side view, in longitudinal section, showing a silencer similar to that shown in FIG. 2 in which the interior gas flow path is divided by an inner shell of the shape of a hollow truncated cone disposed coaxially with the outer shell and having sound-absorbing layers on the inner and outer surfaces thereof;

FIG. 9 is a side view, in longitudinal section showing one example of a known axial-flow air fan and indicating the air flow thereabout during operation;

FIG. 10 is a view similar to FIG. 9 showing an axial-flow air fan provided with one example of a silencer according to the invention and indicating improved air flow;

FIG. 11 is a view similar to FIG. 10 showing an axial-flow air fan provided with another example of a silencer according to the invention;

Figure 12:
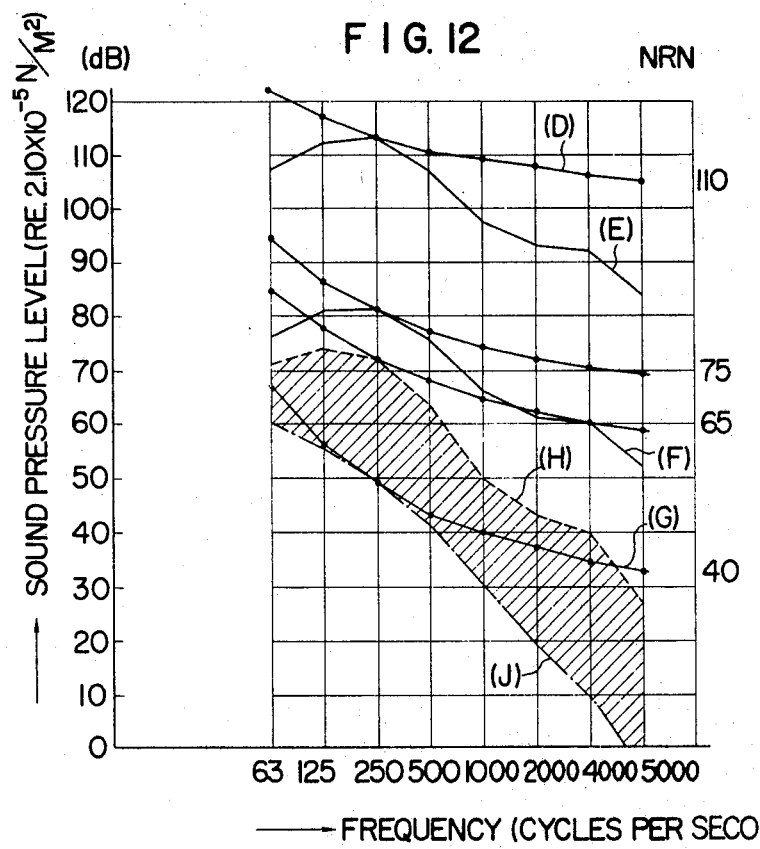
Figure 13:
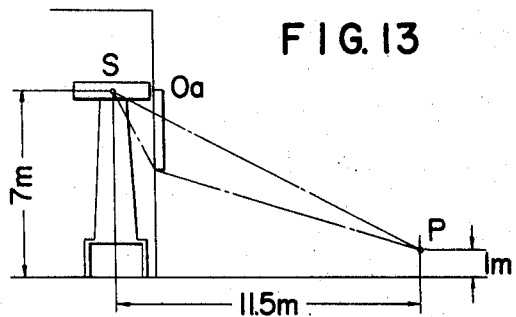

FIG. 12 is a graphical representation indicating a comparison of characteristics with respect to frequency of noise generated by a known axial-flow air fan and of noise generated by an axial-flow air fan provided with a silencer according to the invention; and FIG. 13 is a diagrammatic elevational view showing the essential parts of the apparatus used for experimental measurements from which the characteristic curves of FIG. 12 were obtained.

In general, when a body of a gas under a certain first pressure is released to be discharged in a natural manner through a straight tube to a region at a second pressure lower than the first pressure, the gas is diffused in a conical pattern with a jet angle α which is determined by the difference between the first and second pressures, this jet angle α being, in general between 10 and 40 degrees. As this discharged gas travels away from the point of discharge, the discharge gas velocity decreases until, finally, it is dissipated.

A gas discharge of this nature is accompanied by the generation of excessively loud noise, which is understood to be caused by turbulence accompanying the gas discharge. More explicitly, a turbulent gas flow consisting principally of eddies or vortices is produced by the velocity differences at the interface layer between the discharged gas stream and the surrounding stationary gas and by the differences in the velocities at various parts throughout the discharged gas. The transformation of this turbulent flow into vibration energy gives rise to the excessively loud noise. Therefore, a measure for imparting sound reducing effect can be realized by suppressing as much as possible turbulent flow in the above mentioned interface layer and within the discharge gas flow.

The silencer of the present invention, in general, has a principal outer shell structure of a shape in which the cross-sectional area of the gas flow path therethrough increases progressively in the flow direction at a rate such that the resulting divergent angle of the flow path formed within the shell structure coincides substantially with the jet angle of the high-pressure gas determined by the above mentioned pressure difference, the inner surface of the shell structure, that is, the surface of the structure to contact the gas to be subjected to noise reduction, being covered with a sound-absorbing layer.

The principle of the invention will first be considered with reference to FIG. 1. When a gas under pressure is discharged through a straight tube 1, it disperses with a jet angle α, and the velocity distributions at various cross sections of the resulting gas flow are as indicated by intermittent line curves 5. These velocity gradients within the gas flow progressively decrease in the flow direction and become zero at a point where the gas becomes fully mixed and diffused with the atmosphere.

Since the velocity gradient at the interface layer 2 between the discharge gas flow and the outside air 3 at any cross section is a maximum, vortices of maximum intensity are present in layer form in this interface layer 2. The intensity of these vortices decreases progressively with the distance from the discharge outlet of the stright tube 1 until it is finally dissipated.

In a silencer according to the invention of basic form as illustrated in FIG. 2, an outer shell 7 is communicatively connected at its inner or upstream end to the above mentioned straight tube 1 and is formed with an outwardly divergent angle. In the case wherein this divergent angle is caused be equal to the jet angle α resulting from the natural discharge of the gas, the inner surface of the outer shell 7 will coincide with the interface 2 which would exist in the case of natural discharge. Accordingly, direct contact between the flowing gas and the outside air 3 is prevented by the presence of the outer shell 7 constituting a physical barrier therebetween, whereby there is no generation of a turbulent flow layer due to inductive action of the flowing gas on the outside air 3.

Thus, generation of noise can be suppressed. Moreover, by thus providing an outer shell 7 with a divergent angle equal to or close to the above mentioned jet angle, there is no possibility of development of a back pressure in the discharged gas.

As the discharged gas flows through the outer shell 7, its velocity progressively decreases until, at the discharge outlet 8 of the shell 7 opening to the atmosphere, the velocity is amply reduced, whereby the noise generated in the region downstream from the discharge outlet 8 is of very low level.

The velocity gradient at the inner surface of the outer shell 7 existing in the position of the above mentioned interface layer is still of large magnitude and generates noise of high intensity. Accordingly, as a noise reducing measure, the entire inner surface of the shell 7 is covered with a sound absorbing layer 9 made of a sound absorbing material of a specific thickness, as mentioned hereinbefore. The sound absorbing layer 9 absorbs most of the noise generated at the part corresponding to the above mentioned interface layer and, at the same time, functions also to absorb noise generated by velocity gradients arising within the discharge gas stream. The velocity distribution across one cross section of the silencer interior is indicated in FIG. 2 by intermittent-line curve 5a constituting an envelope of the velocity components 10–1, 10–2, etc. at that cross section.

The gas flow path within the silencer illustrated in FIG. 2 may be divided into two concentric flow paths as shown in FIG. 3 by an inner shell 7a disposed coaxially relative to the outer shell 7 and covered over the inner and outer surfaces thereof with sound absorbing layers 9a, 9a. In this case, the gas discharged through tube 1 is caused to flow in divided flow paths with velocity distributions as indicated by intermittent-line curves as, for example, curve 5a–1. Thus, it will be apparent that the resulting velocity distriutions are different from that indicated by curve 5a in FIG. 2, and the absolute velocity differences mutually between the velocity components 10a–1, 10a–2, etc., are remarkably reduced. Therefore, the inner shell 7a provides an increase in the sound absorbing area and, moreover, functions also to impart a flow straightening effect and to decrease velocity gradients.

In another embodiment of the invention as illustrated in FIGS. 4, 5, 6, and 7, the silencer shown therein has an outer structure consisting of an inlet pipe 15 for introducing steam or a compressed gas (hereinafter referred to as "fluid") and an outer shell 7 contiguously connected to the discharge end of the inlet pipe 15 and enclosing and forming a part of a noise silencing structure. The inlet pipe 15 has a flange 15a at its inlet end for connection to a pipe line or some item of equipment (not shown) from which the fluid is to be released.

The inlet pipe 15 has the form of an increaser, and the ratio of the cross-sectional areas at its inlet and outlet is from 1:1 to 1:2. The noise silencing structure is of concentric construction and comprises a central inner shell 7c, an intermediate shell 7b, and the outer shell 7, the inner and intermediate shells 7c and 7b being coaxially supported and secured to the outer shell 7 by support struts 14, 14. The discharge end 16 of the noise silencing structure thus constituted is diagonally cut and lies in a plane at an angle of from 30 to 60 degrees relative to the longitudinal axis of the structure.

While a single intermediate shell 7b and a central inner shell 7c are shown in the illustrated example, two or more intermediate shells may be used with or without the central inner shell, depending on the desired effectiveness of the silencer.

Figure 4:
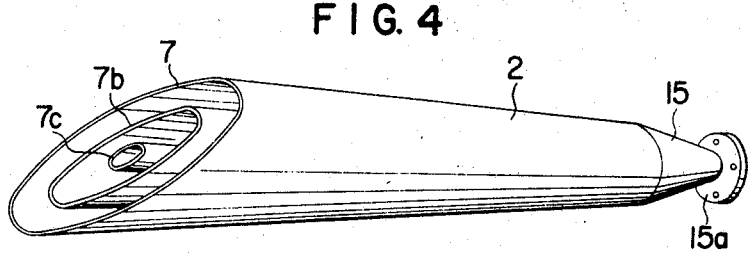
FIG. 4 is a perspective view, showing one example of a silencer according to the invention.
Figure 5:
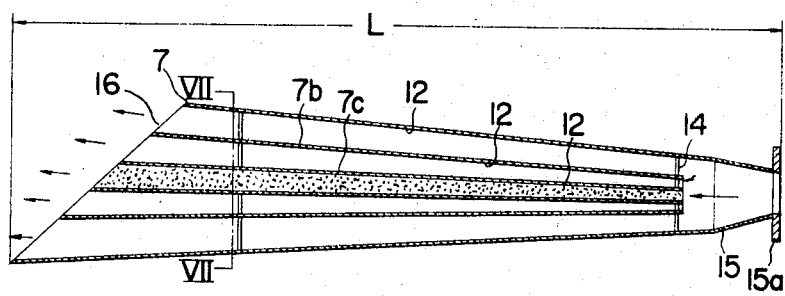
FIG. 5 is a side view, in longitudinal section, of the silencer shown in FIG. 4.
Figure 6:
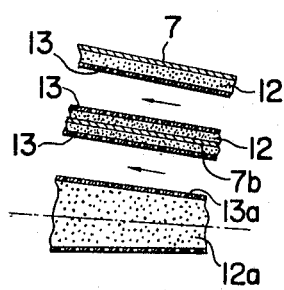
FIG. 6 is an enlarged, fragmentary view showing the details of one part of the view shown in FIG. 5.
Figure 7:
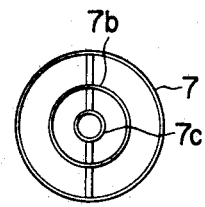
FIG. 7 is a cross-sectional view taken along the plane indicated by line VII–VII in FIG. 5.

As shown in FIG. 6, the outer shell 7 is a hollow truncated cone formed from a material of high mechanical strength such as steel sheet or plate and is covered over its entire inner surface with a sound absorbing layer 12 of a specific thickness made of a sound absorbing material such as glass fibre or asbestos. The entire inner surface of the layer 12 is covered with a retaining layer 13 made of a perforated sheet material to retain and protect the surface of the sound absorbing layer 12 and to prevent erosion thereof.

The intermediate shell 7b is similarly a hollow truncated cone formed from a material such as steel sheet or plate and is covered over the entire inner and outer surfaces thereof with sound absorbing layers 12, 12 similar to that of the outer shell 7, which layers 12, 12 are similarly covered with respective retaining layers 13, 13.

The inner shell 7c comprises an outer shell 13a of a perforated sheet material formed into a hollow truncated cone of small taper and a sound absorbing material 12a filling the interior of the cone.

As is well known, the discharge end 16 of the silencer cut diagonally at an angle of from 30 to 60 degrees relative to the silencer axis as described above causes mutual nullification of resonance effects of specific frequencies within the silencer shells, and the increased area of the exit section makes possible a further decrease in the velocity of the fluid at the discharge end. Moreover, there is no occurrence of reaction due to change of direction of the fluid flow within the silencer, whereby directivity can be imparted thereto.

In the silencer of the above described construction, the fluid under pressure passes through the inlet pipe 15 and flows into the noise silencing structure. The fluid then proceeds to flow through this structure to the discharge end as its pressure and velocity are progressively diminished. During this flow, the fluid is subjected to the noise silencing effect as described above, whereby the fluid discharged from the discharge end 16 releases its kinetic energy, and the noise generated is amply reduced.

The principal dimensions and configurations of the above described silencer are determined in the following manner. The angles of divergence of the shells of the silencer are determined within a range of from 7 to 33 degrees, which is from 3 to 10 degrees narrower than the jet angle determined by the aforementioned pressure difference, that is, from 10 to 40 degrees. The sectional area of the discharge end 16 is so determined that the fluid discharge velocity at the section will be less than 60 metres/sec. Furthermore, the length L of the silencer is also selected in accordance with the required degree of noise reduction, similarly as in the selection of the number of intermediate shells and in the decision on whether or not to use an inner shell.

Figure 8:
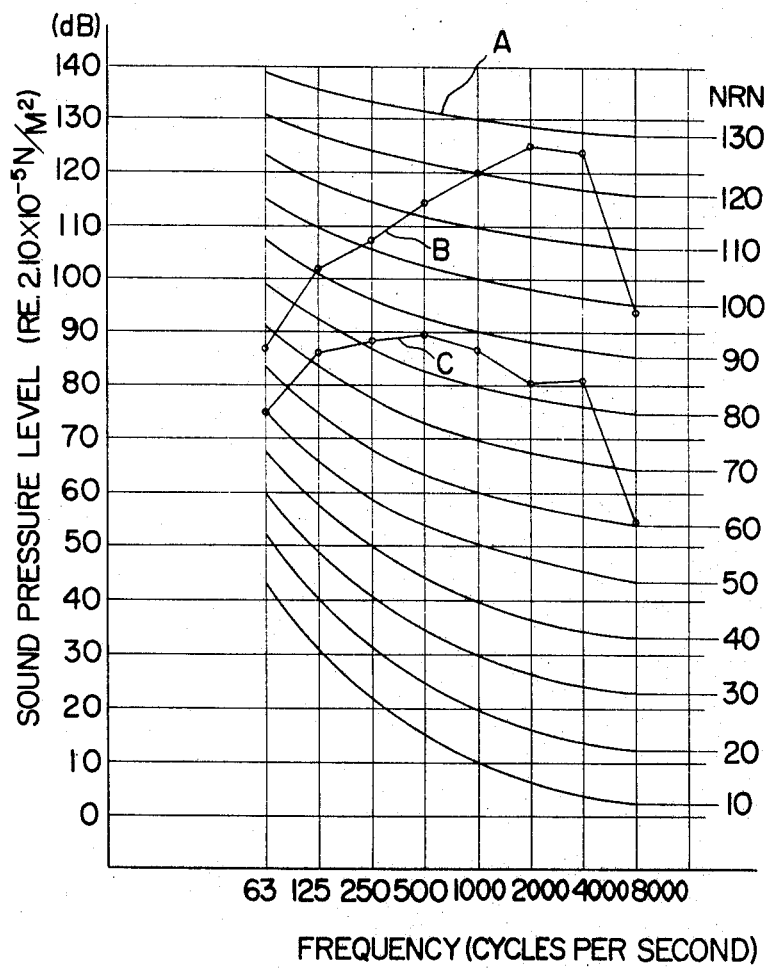
FIG. 8 is a graphical representation indicating the sound reducing effect due to a silencer of the invention.

The noise reducing effectiveness of the silencer according to the invention is indicated by the results as shown in FIG. 8 of one instance of actual practice. In this graphical representation, contour line (A) is one of a family of similar contour lines shown therebelow each of which is an isophonic contour joining the respective points of sound pressure levels which noise at various frequencies impart isphonicly to the human ear and is generally referred to as a noise rating number (NRN) curve. The noise rating number is generally expressed in terms of the magnitude of the sound pressure level at a frequency of 1,000 c./s.

In the same FIG. 8, curve (B) is a frequency characteristic curve of noise emitted from a specific noise source (in this case, high pressure steam at a pressure of 10 kg./cm.$^2$ discharged into the atmosphere through a 2-inch nozzle at a flowrate of 3 tons/hour), the noise being measured at a position 8 metres directly in front of the nozzle.

To the nozzle of the above described noise source, a silencer in accordance with the invention was connected. This silencer comprised outer, intermediate, and inner shells and had an overall length of 1.4 metres, an inlet throat diameter of 2 inches, a shell divergent angle of 6 degrees, and a diagonally cut discharge end at an angle of 45 degrees relative to the silencer axis. Steam was discharged under the same conditions as in the case when the curve (B) was obtained, and the resulting noise was measured at the same position, whereupon completely satisfactory noise-reducing results as indicated by curve (C) were obtained.

While the invention has been described above with respect to silencers for fluid discharge, is should be understood that the present invention can be applied also to silencers for reducing noise arising from fluid suction or aspiration with the same facility and effectiveness.

The silencer according to the present invention has the following advantageous features.

(1) Since the flow direction of the fluid does not change, the pressure loss due to the silencer is very small. Accordingly, when the silencer is used, for example, for reducing the noise of discharge of a safety valve, the adjustment of the discharge pressure of the safety valve is facilitated.

(2) Since a reaction force is not produced at the time of fluid discharge, the construction of the mounting part of the silencer can be simplified, and the handling of the silencer also is facilitated.

(3) High noise reducing performance is obtained by a silencer of simple organization and relatively small overall size.

(4) Since the organization is simple, and the overall size is small, the adaptability of the silencer with respect to the required degree of noise reduction is excellent.

The silencer of the present invention in various embodiments thereof has wide applicability, one typical example of which is the use of the silencer to reduce the noise of an axial-flow fan of an air-cooled heat exchanger, as described below.

With the recent scarcity of water for industrial use in most industrial areas, there has been a rapid increase in the use of air-cooled heat exchangers to take the place of formerly used water-cooled heat exchangers. Since an air-cooled heat exchanger of this type requires a supply of a large flowrate of air at a relatively low pressure, an axial-flow fan is generally used for supplying this air. In general, an axial-flow fan for this purpose is of large size with a propeller diameter of the order of from 1.8 to 5 metres and produces an air velocity below 60 metres/sec. Moreover, the air flow through the fan is such that, on the suction side, the flow velocity is high at the outer periphery and decreases toward the centre, and vortices are formed in the vicinity of the rotational axis, whereby a part of the fan driving power is wasted.

Furthermore, the noise generated by an axial-flow fan is as high as from 90 to 110 phon (average) at a distance equal to the propeller diameter from the end of the fan casing. Since the frequency characteristic of this noise is such that a greater part of the components are of frequencies below 500 c./s., noise reduction is difficult and, in general, has heretofore been neglected, whereby this noise has been a source of discomfort to persons in the vicinity of fans of this type and even a source of public nuisance.

This noise can be reduced in a simple manner by the application of the silencer of the present invention whereby noise components of frequencies higher than 200 c./s. which cause discomfort to the human ear of the noise generated by an axial-flow fan of the type referred to above are reduced without causing any appreciable rise in the power required for driving the fan.

The causes of noise generated by an axial-flow fan may be divided into the following kinds.

(1) Intermittent cutting of air layers by the rotating propeller blades.

(2) Vortices created particularly in the vicinity of the rotational axis and blade tips.

(3) Vibration of the propeller blades.

(4) Other causes such as vibrations of structural parts.

Noise due to cause (4), above, can be suppressed by a direct measure such as increasing the rigidity of the structural parts. All of the causes other than cause (4), however, are due to the basic nature of construction and operation of the fan, and, therefore, a supplementary measure such as the installation of a silencer is more practical and effective.

In one example as illustrated in FIG. 9 of an axial-flow fan of the type referred to above, a propeller 23 fixed to and driven by a shaft 22 is positioned to rotate within a ring 21 and thereby to draw air through a nest 30 of a large number of thin tubes, such as a radiator, through which tubes a fluid is passed and thereby cooled, and the air thus drawn is discharged to the opposite side of the propeller, as indicated by arrows. On the discharge side, vortices as indicated by arrows are formed by differences in the flow velocities of the flowing air.

As mentioned hereinbefore, when vortices are formed in the vicinity of the rotational axis, the air flowrate is reduced correspondingly, whereby the effective air delivery of the fan decreases, and, consequently, there is a loss of air delivery power.

One example of a silencer of the invention installed on the discharge side of the above described axial-flow fan as illustrated in FIG. 10 to overcome the above described difficulties comprises a silencer outer shell 24 and an inner shell 26. The outer shell 24 is made of steel sheet formed into a truncated cone with an outwardly divergent angle and covered over its inner surface with a sound absorbing material such as asbestos or glass fibre of a specific thickness. Accordingly, the outer shell 24 causes the dynamic pressure of the fan to be recovered as an effective static pressure and, moreover, has the effect of reducing the noise.

In the case where the fan diameter is large, or when necessitated by the required degree of noise suppression, it is possible to install also an intermediate shell 25 as shown in FIG. 11. The intermediate shell 25 is made of steel sheet formed into a truncated cone with an outwardly divergent angle and is covered over its inner and outer surfaces with a sound absorbing material of specific thickness. In this case, the intermediate shell 25 functions as a flow straightening guide plate on the discharge side and also has the effect of absorbing and diminishing noise.

The length $l$ in the axial direction of the outer shell 24 and the intermediate shell 25 is determined from the relationship of the frequency range of the noise to be reduced and the velocity of sound. One or more intermediate shells 25 can be used depending on the required degree of noise reduction.

The inner shell 26 is made of steel sheet formed into a truncated cone with an outwardly divergent angle and is closed at its outer or downstream end by a cover plate 27. The inner and outer surfaces of the inner shell 26 and its cover plate 27 are covered with a sound absorbing material. The inner or upstream end of the inner shell 26 is covered by a sound absorbing structure consisting of a combination of a perforated plate 29 and a porous sound absorbing material.

Thus, the inner shell 26 has a construction which is a modification of the so-called Helmholtz resonator. Accordingly, a part of the noise energy is passed through the perforated plate 29 and enters the interior of the inner shell 26 whereby sounds of certain frequencies are damped in accordance with the principle of the Helmholtz resonator, and the sounds of other frequencies are absorbed and reduced in intensity by the sound absorbing material covering the inner surface of the inner shell 26.

Furthermore, the upstream and lateral outer surfaces of the inner shell 26 serve to smooth and straighten the vortices produced in the vicinity of the propeller axis and, therefore, have the effect of increasing the fan efficiency. The shape and dimensions of the inner shell 26 are determined by the frequenceis of the noise to be reduced.

By the above described outwardly divergent construction, the silencer according to the invention causes recovery of the fan dynamic pressure as effective static pressure, and vortices are eliminated by the position of the inner shell on the silencer axis thereby to cause an increase in the fan efficiency. Moreover, the silencer of the invention has high noise reducing effectiveness due to the multiplication, in effect, of the noise reducing effect of the sound absorbing material of large surface area disposed in the form of concentric cones coaxially relatively to the silencer axis and the noise reducing effect due to the hollow inner shell.

In the reduction of noise through the use of a silencer according to the invention, the noise reducing performance of the silencer can be adjusted in accordance with the requirements by appropriately selecting factors such as the shape and dimensions of the inner shell 26, the use of one or more intermediate shells 25, the number of intermediate shells 25, and the length $l$ of the shells.

Furthermore, it is possible, as illustrated in FIG. 11, to install the above described silencer on the discharge side of the propeller 23 and, in addition, to install another silencer comprising an outer shell 31, an intermediate shell 32, and an inner shell 33 on the inlet or suction side of the propeller. In such an installation, it is necessary that the silencer on the suction side have an organization capable of reducing noise and a streamlined configuration such that the silencer parts will not disturb the flow of air and will not constitute parts imposing unnecessary air resistance.

The noise reducing effectiveness of the silencer of the invention is further indicated by the NRN curves shown in FIG. 12 resulting from an actual instance of installation of a silencer according to the invention in a large axial-flow fan which was connected to an air-cooled heat exchanger and had a propeller of 3.6-metre diameter rotating at 300 r.p.m. As indicated in FIG. 13, the fan constituting a noise source S was positioned at a height of 7 metres above the ground level G.L., and the noise emitted therefrom was measured at a sound reception point P positioned 1 metre above the ground level at a horizontal distance of 11.5 metres from the noise source S.

In FIG. 12, curve (E) is the acoustic output curve of the large axial-flow fan and corresponds to NRN–110. Curve (F) indicates the frequency characteristic values of the noise at the sound reception point P in the case wherein sound insulation and sound absorption effects are not considered and, corresponding to NRN–75, indicates the reduction of curve (E) due to distance. Curve (G) is the NRN curve corresponding to an allowable value of noise at the sound reception point P of NRN–40. Accordingly, in the case of an allowable noise value of NRN–40, it is necessary to take various noise reducing measures before the noise characteristic curve assumes sound pressure levels below those of the curve (G).

In accordance with the graph shown in FIG. 12, we carried out tests on the characteristics of the silencer of the invention. Curve (H) indicates the sound reducing effect due to the provision of a sound shielding wall O–Oa as shown in FIG. 13. From this result it was clearly apparent that a measure of this order wherein a small-scale noise shielding O–Oa was provided was insufficient to reduce the noise to a value below the above mentioned allowable noise value.

Then, when a silencer according to the invention was installed on the discharge side of the large axial-flow fan, and measurements were made at the sound reception point P, it was possible to obtain results, as expected, as indicated by curve (J). In FIG. 12, the region with diagonal cross hatching indicates the sound pressure level values reduced by the silencer of the invention.

What we claim is:

1. In an axial flow fan for the discharge of a fluid under a first pressure through a tube to a region at a second pressure lower than the first pressure, whereupon the fluid is dispersed with a jet angle $\alpha$, said angle being determined by the difference between the first and second pressures, the improvement which comprises a silencer connected to said tube, said silencer comprising an outer shell and an inner shell disposed within the outer shell, each shell having the shape of a hollow truncated cone or pyramid with a divergent angle in the outward discharge direction, said shells defining concentric gas flow paths and having sound absorbing material on surfaces thereof along which said fluid is to flow, said shells being coaxial with said axial flow fan, the shape of the outer shell being such that the cross-sectional area of the gas flow path therethrough increases progressively in the flow direction at a rate such that the resulting divergent angle of the flow path formed within the shell structure is substantially equal to said jet angle $\alpha$.

2. In an axial flow fan for the discharge of a fluid under a first pressure through a tube to a region at a second pressure lower than the first pressure, whereupon the fluid is dispersed with a jet angle $\alpha$, said angle being determined by the difference between the first and second pressures, the improvement which comprises a silencer connected to said tube, said silencer comprising an outer shell and an inner shell disposed within the outer shell, each shell having the shape of a hollow truncated cone or pyramid with a divergent angle in the outward discharge direction, said shells defining concentric gas flow paths and having a sound absorbing material on surfaces thereof along which said fluid is to flow, said shells being coaxial with said axial flow fan, the shape of the outer shell being such that the divergent angle is substantially equal to said jet angle $\alpha$.

References Cited

UNITED STATES PATENTS

| | | | |
|---|---|---|---|
| 1,940,790 | 12/1933 | Diehl | 181—46 XR |
| 2,144,631 | 1/1939 | Kurth. | |
| 2,415,621 | 2/1947 | Arnhym. | |
| 3,346,174 | 10/1967 | Lievens et al. | 230—232 XR |

FOREIGN PATENTS

| | | |
|---|---|---|
| 601,872 | 8/1934 | Germany. |
| 444,206 | 3/1936 | Great Britain. |

ROBERT S. WARD, Jr., Primary Examiner

U.S. Cl. X.R.

181—46, 50, 56; 230—59, 233